United States Patent
Marcy

[11] 3,732,796
[45] May 15, 1973

[54] LINE TRACING SYSTEMS USING LASER ENERGY FOR EXPOSING PHOTO-SENSITIVE SUBSTRATES

[75] Inventor: Raymond Marcy, Paris, France

[73] Assignee: Thomson-CSF, Paris, France

[22] Filed: July 8, 1971

[21] Appl. No.: 160,725

Related U.S. Application Data

[63] Continuation-in-part of Ser. No. 5,619, Jan. 26, 1970, Pat. No. 3,632,205.

[30] Foreign Application Priority Data

July 9, 1970 France..................................7025559
Aug. 14, 1970 France..................................7030040

[52] U.S. Cl...................................................95/12
[51] Int. Cl........................................................G03b
[58] Field of Search..........................................95/12

[56] References Cited

UNITED STATES PATENTS

3,632,205  1/1972  Marcy................................95/12 X
3,518,925  7/1970  Chitayat..............................95/1.1
3,524,394  8/1970  Sunners..................................95/12

Primary Examiner—John M. Horan
Assistant Examiner—Kenneth C. Hutchison
Attorney—Cushman, Darby & Cusham

[57] ABSTRACT

The invention relates to systems for automatically tracing onto a photo-sensitive substrate various patterns such as used in the manufacture of integrated circuits. The system according to the invention comprise means for displacing the substrate along two mutually perpendicular directions, means for controlling said displacements in relation to a program supplied from a computer and as a function of monitoring signals supplied from position detection means; the laser tracing beam is digitally deviated along a line parallel to one of said directions and under the control of the substrate motion along said other direction.

9 Claims, 7 Drawing Figures

LINE TRACING SYSTEMS USING LASER ENERGY FOR EXPOSING PHOTO-SENSITIVE SUBSTRATES

The present patent application is a continuation-in-part of a copending patent application Ser. No. 5,619 filed Jan. 26, 1970, now U.S. Pat. No. 3,632,205, for R. MARCY.

This invention relates to improvements in electro-optical tracing systems employed in the manufacture of integrated microcircuits or masks for producing said circuits.

These systems usually employ a source of light of the laser type. Depending on the power of the latter, various methods are possible. With a low-power laser source, masks are produced from photo-sensitive plates which are exposed to the source. Using a more powerful laser, for example an argon laser, layers of a "photo-resist" successively deposited upon the substrate are directly exposed. Using a very powerful laser source, for example a yttrium-aluminum garnet (YAG) laser, a mask can be produced using the laser energy to cut a thin metal plate. In these systems the light beam is usually fixed and it is the plate which is subjected to programmed mechanical displacements in relation to the optical projecting system. Various patterns, the shape of which has been previously selected, can thus be traced and connected with one another by means of integrated interconnections.

However, the high inertia of the mechanical device serving to move the plate in relation to the optical system results in unduly long tracing times.

It is an object of the present invention to reduce tracing time when controlling the relative position of a laser beam and a target plate. The invention relates to a system for tracing predetermined patterns on a photo-sensitive substrate disposed on a carriage which is movable in two perpendicular directions X and Y. The precise movements of this substrate are controlled by a computer in accordance with the patterns to be traced and monitored by laser interferometry. The substrate is illuminated by means of a tracing laser beam, modulated in accordance with an all or nothing method by the computer. A digital electro-optical deviator causes the tracing beam to deviate in one and only one, of the two directions X or Y. The combination of the mechanical displacements of the substrate and the optical displacements of the tracing beam, controlled by the computer, enables tracing of characters, patterns, symbols or circuits at a very rapid rate. In a rather more elaborate modification, the tracing system comprises an assembly whereby it is possible simultaneously, to project the base circuit patterns and produce, with the aid of the tracing beam, connection with one another of the circuit patterns.

The control of the digital deviator, effected by a binary counter which is part of the computer depends on the advance in one of the two X or Y directions of the substrate, so that the tracing itself is independent of the speed and irregularities in the displacements of this substrate inherent in mechanical systems.

According to the invention, there is provided a line tracing system using a beam of laser energy for exposing a photo-sensitive substrate comprising : a source of coherent radiant energy emitting said beam, supporting means for allowing displacements of said substrate in two mutually perpendicular directions, deflection control means having at least two control inputs, first and second motors means for respectively positioning said substrate along said directions, first and second monitoring means respectively evaluating the displacement of said substrate along said directions, and a digital optical deflector positioned on the path of said beam between said source and said substrate ; said motor means being connected to and controlled by data derived from said deflection control means ; said digital optical deflector being connected to and controlled by data from said deflection control means ; said two control inputs being respectively controlled by data supplied from said first and second monitoring means.

For a better understanding of the invention and to show how the same may be carried into effect, reference will be made to the ensuying description and the following drawings among which.

Figure 1:
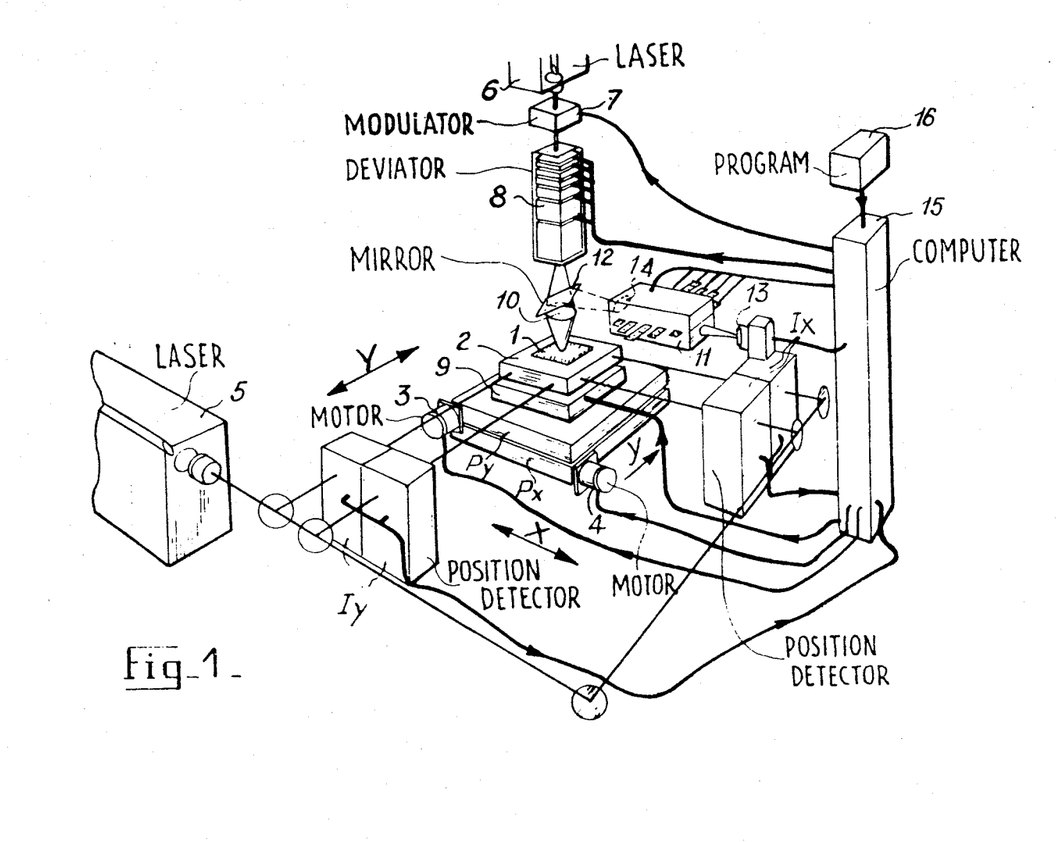
FIG. 1 is an assembly view of a tracing system according to the invention.

FIG. 1 shows a tracing beam emitted by a laser source 6, for the inscription of patterns or designs on a photo-sensitive substrate 1, the beam passing through, in succession : a light modulator 7, for example an all or nothing modulator, so as to interrupt or transmit the light in accordance with the pattern to be inscribed, and a digital electro-optical deviator 8 having $n$ deviation stages and capable of deviating the beam passing therethrough to one direction among $2^n$ directions all of which are in common plane, the trace of this beam on the substrate 1 being thus deviated to one position amond $2^n$ positions aligned in one of the two orthogonal directions of the mechanical displacements of the substrate, for example in the Y direction.

The substrate 1 on which the patterns are to be traced is placed on a support 2 which is movable in two orthogonal directions X and Y by means of two crossed carriages $P_x$ and $P_y$ driven by motors 3 and 4. The displacements of these two carriages are controlled by position-detectors , for example of the laser interferometry type illuminated by a further laser source 5 ; the position detector $I_y$ measuring the displacements of the support 2 in the Y direction, the other position detector $I_x$ measuring the displacements in the X direction. Attitude or yaw deviations are corrected by a correcting unit 9 located between support 2 and carriage $P_y$.

A lens 10 projects onto the substrate 1 a luminous spot deviated by the deviator 8.

The light deflecting element which displaces a polarized light beam by digitized quantities can for example consist of a succession of cells each of which has an electro-optical crystal followed by a birefringent crystal.

Each elementary cell is capable of deviating the light beam to two distinct positions under the action of an electric voltage. Consequently, for a deflector having $n$ cells, the maximum number of possible points is equal to $2^n$. The switching from one point to another can be effected in any order and within an interval of time in the order of a microsecond.

A projecting device 11 simultaneously projects onto the substrate 1 by means of a semi-reflecting mirror 12 the image of a base pattern illuminated by a light bulb 13. An optical system 14 associated with the lens 10 permits obtaining for example a reduction of between 10 and several tens between the image illuminated by the lens and the corresponding pattern projected onto the substrate 1. This projecting device, which is not essential since the patterns can always be traced by the laser beam emitted by the source 6, is however quite advantageous in the production of logical circuits, flipflops . . . M S I masks having a scale 10 and possible L S I masks having a scale one, the number of possible patterns being then limited. It will be understood that even in this case the connections between the patterns are produced by the laser tracing beam.

A computer 15, fed by a program 16 representing the whole of the design or pattern to be inscribed, receives the data supplied by the interferometers $I_x$ and $I_y$, controlling the displacement of the carriages, and controls, in accordance with the program 16, on one hand, and with these data, on the other, the modulator 7, the deviators 8 and the motors 3 and 4.

Figure 2:
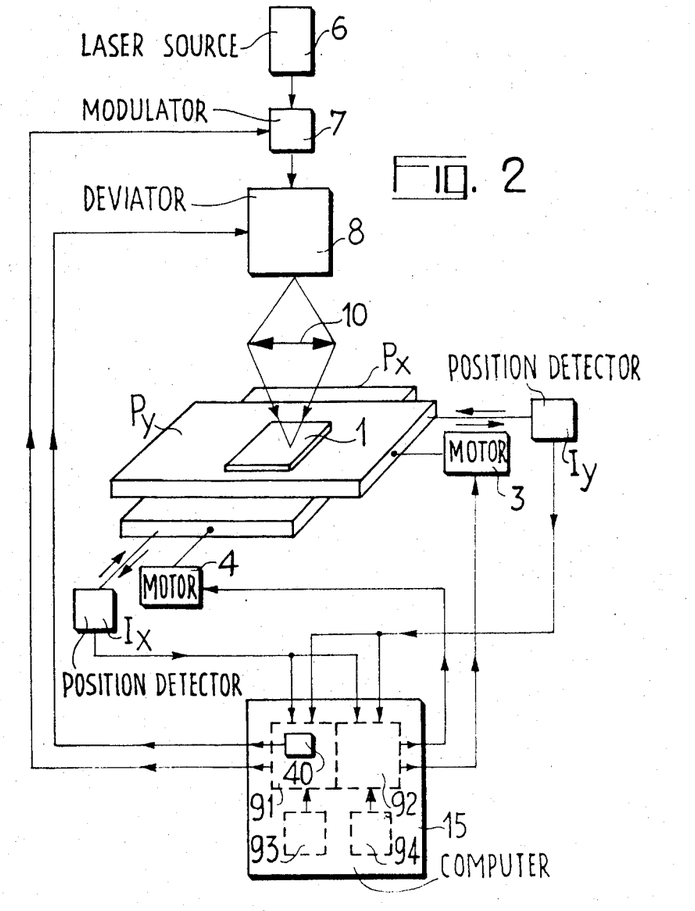
FIG. 2 is a schematic diagram of the tracing system shown in FIG. 1.

FIG. 2 shows the main elements in FIG. 1 and more particularly illustrates the computer 15. Similar elements carry the same reference characters as in FIG. 1. The computer 15 can for example consist of two subsystems 91 and 92 supplied respectively with the different programs from instruction units 93 and 94 ; both subsystems 91, 92 also are supplied with the data coming from the position detectors $I_x$ and $I_y$. The subsystem 92 comprises two command counters, not shown in FIG. 2, which with the help of the data which they receive respectively from the position detectors $I_x$ and $I_x$ determine the number of measurement quanta through which one and/or the other of the carriages $P_x$ and $P_y$ carrying the substrate 1 has displaced. The result of the comparison of these measured numbers with the data furnished by the instruction unit 94, is used to control the motors 3 and 4. The sub-system 91 comprises a binary counter 40 each stage of which controls each one of the deviating cells of the deflector 8. The binary counter 40 is operative only when it receives pulses from one of the position detectors, for example $I_x$. It is blocked when the sub-system 91 receives pulses from the other position detector, namely $I_y$ in the chosen example. Thus the digital deviation is effected only in a single direction since any displacement of the substrate 1 in another direction causes the interruption of this deviation. Consequently, the successive displacements of the laser beam which are effected by the deflector 8 are directly controlled by the movement of the carriage $P_x$. This strict control of the digital deflector 8 by the movements of the substrate 1 makes it possible to render the tracing described on the plate 1 independent of the speed and irregularities of the movement of the substrate. Further, the sub-system 91 controls a light modulator 7 inserted between the laser source 6 and the deflector 8 so as to extinguish the source 6 when no tracing is to be effected.

The instruction unit 93 supplies a program which relates to the inscription proper. It simply contains the addresses of data which will define the geometry of the patterns described by the beam. It also permits calling upon standard programs which command tracing of a line or an area by specifying the addresses of limit points only.

Figure 3:
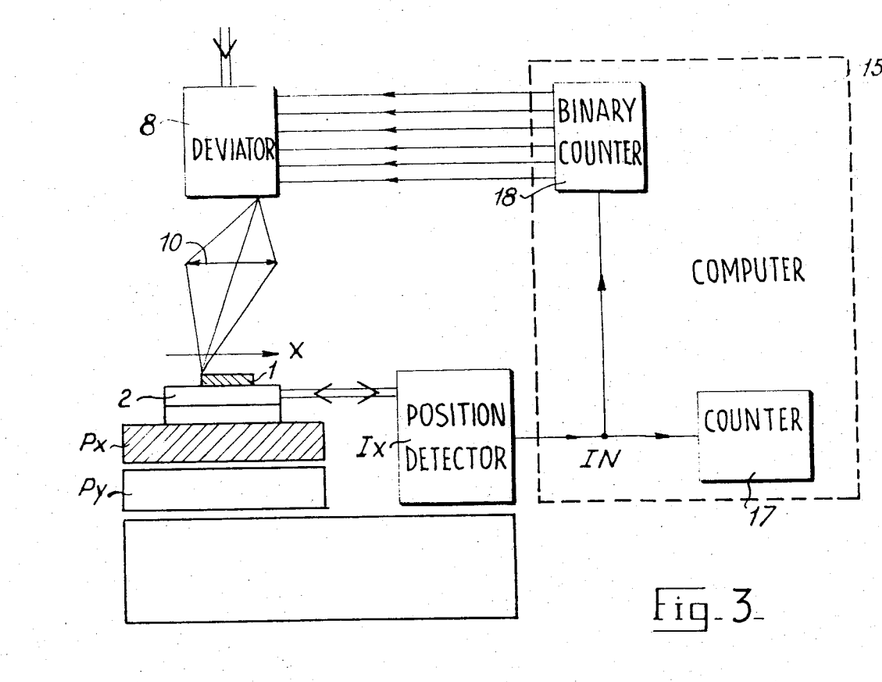
FIG. 3 is a schematic diagram of the control circuits of the digital deviator.
Figure 4:
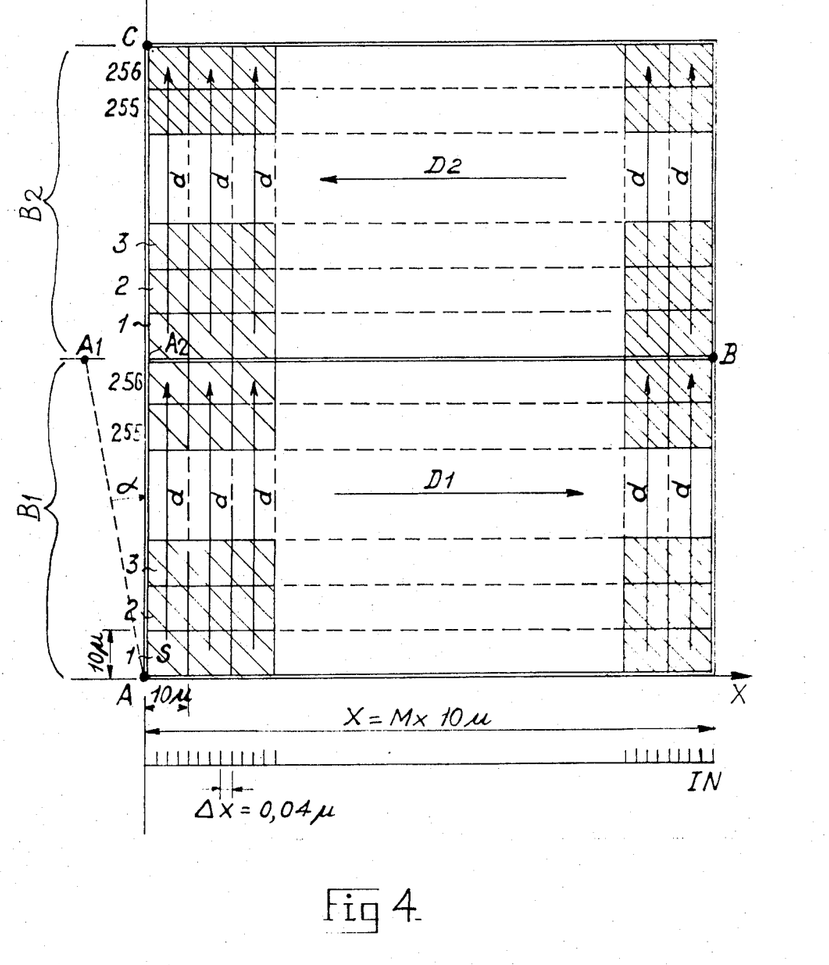
FIG. 4 is a graph illustrating the different tracing operations of a system according to the invention.

FIGS. 3 and 4 show very diagrammatically the functional relations established by the computer 15 between the mechanical and the optical part of a tracing system according to the invention.

In the presently-described embodiment, the deviations of the digital deviator 8 are controlled by the displacements of the substrate 1 in the X direction, as will not be described.

The carriage $P_x$ for movement in the X direction causes, as has been explained displacements of the substrate 1 in the X direction, these displacements being measured by a laser interferometric unit $I_x$ illuminating for example a mirror which is secured to the side of the support 2 and disposed perpendicularly to the direction X. The method of measuring these X displacements is not described here ; it employs known interferometric methods and gives a quantified measurement of the displacements. The measurement quantum $\Delta X$ which is a fraction of the wavelength of the laser beam employed, depends on the interferometric system $I_x$ itself. In one example this measurement quantum $\Delta X$ can equal 0.04 micron.

As shown in FIG. 4, in the course of the X displacements, the system $I_x$ generates a pulse $I_N$ each time the substrate 1 is displaced $\Delta X$. The last line in FIG. 4 represents diagrammatically a succession of such pulses $I_N$ (the scale of this line and that of the rest of the Figure are not the same).

These pulses serve to determine the overall displacement quantities of the plate 1 in the X direction, with the use of a counter 17 for example, which totalizes the pulses $I_N$ defining the total quantity $\Sigma \pm \Delta X$ through which the carriage $P_x$ is displaced and indicates it to the computer 15. Further, they are applied in accordance with the invention to a counter 18 also connected to the computer 15. This counter 18 is a cyclic counter having $n$ stages, $n$ being equal to the number of deviation cells of the digital deviator 8, each stage of which controls a cell of said deviator.

In order that the tracing of the pattern be effected properly, as will be described, the direction in which the deviator 8 deviates the laser beam and the direction of displacement of the substrate 1 serving to digitally control the $n$ stages of this deviator 8 are orthogonal. Thus, in the embodiment shown in FIGS. 3 and 4, the deviator 8 deviates the laser beam in the direction Y.

FIG. 4 diagrammatically illustrates the manner of tracing the patterns on the substrate 1.

The trace of the laser tracing beam is, for example, a square spot S having a 10 $\mu$ side dimension. A pulse $I_N$ is delivered each time that the carriage $P_x$ moves a measurement quantum $\Delta X$, for example equal to 0,04 micron, and controls the displacement of the laser beam in such manner that its spot S moves from 1 to 2, the direction of displacement being, as mentioned before, in the Y direction. In the present example, the digital deviator 8 could have 8 stages, which corresponds to 256 possible juxtaposed positions for the spot S.

In order to take into account the composition of the mechanical displacement along X and the digital displacement along Y which would bring the trace S to position $A_1$ instead of $A_2$ in its 256th position, it is well to incline the trace A $A_1$ made theoretically by the deviator through an angle so that in the course of displacement along X effected by the carriage $P_x$ the trace in fact produced by the deviator is A $A_2$ which is parallel to the Y axis.

The angle $\alpha$ is determined by :

$\alpha = \arctan(\Delta X/l)$ in which $\Delta X$ is the measurement quantum of the displacements along X and $l$ is the width of the spot S projected onto the substrate on which the inscriptions are made.

Thus, in the ource of the displacement of the carriage $P_x$ along $D_1$, the tracing beam sweeps successively through M elementary bands of width $l$ (here 10 $\mu$) along X and of length $L = m \times l$ (here $256 \times 10 \mu$) along Y, $m$ being at maximum equal to $2^n$.

After this first band $B_1$ has been constituted, the substrate 1 is moved along Y an amount $\Delta Y = L$ by the carriage $P_y$. In this way, a second band $B_2$ is then described in the direction $D_2$ between the points B and C, and so on.

As the time for switching the digital deflector is in the order of 5 microseconds, it is possible, by means of a system which is arranged in this way to define on a relatively large plate, for example a plate of 100 cm², juxtaposed spots of $10 \times 10$ microns in only 48 minutes.

All these juxtaposed spots are defined digitally without ambiguity and permit the reproduction by programming the different displacing, deviating and modulating means, extremely complex exact patterns which are very well adapted to masks for L S I for example.

Figure 5:
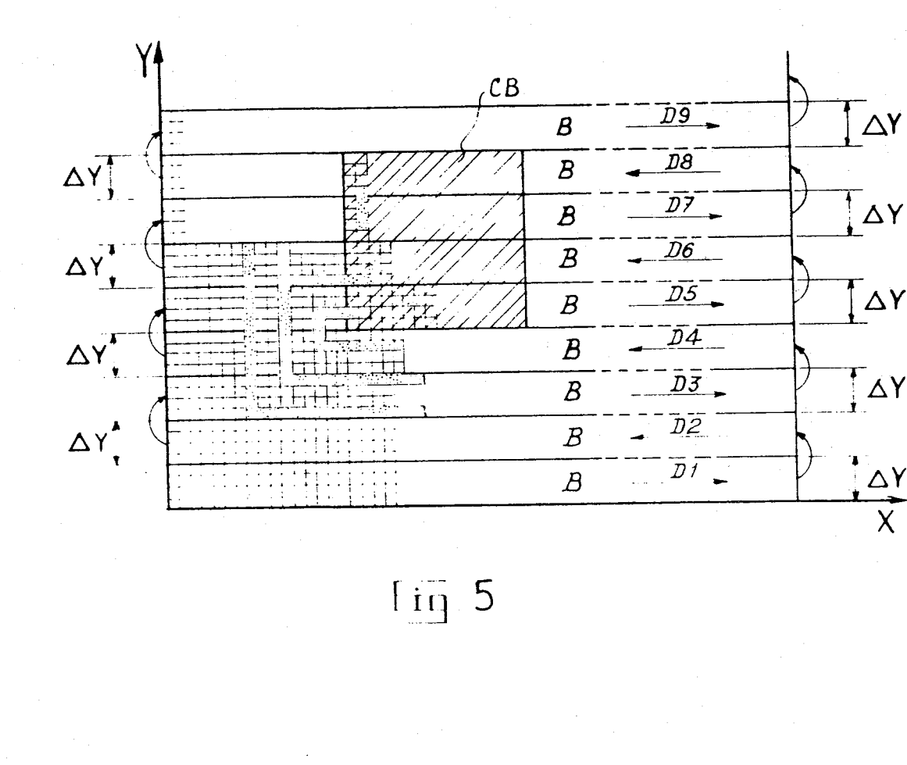
FIG. 5 is a diagrammatic representation of an embodiment of a part of a mask drawn by means of a system according to the invention.

FIG. 5 shows an embodiment of an L S I mask with a tracing system such as those hereinbefore described in their most elaborate version comprising a base pattern projector.

This FIG. 5 shows diagrammatically :

the surface occupied by the base patterns CB which represent, for example, logic circuits and are not explained in detail here ;

the quadrilling of the bands B is effected by the combination of the digital deviation in the Y direction and of the mechanical displacement in the X direction (the scale is not respected here)

the bands B juxtaposed by a mechanical translation $\Delta Y$ which is effected after the tracing of each of the bands B.

The assembly of the quadrillage covers the whole of the surface of the mask and permits, by deblocking the light modulator 7, the tracing of the interconnections between the base circuits CB and even inside the latter. The modulator is controlled by the computer 15 in accordance with the program 16 with which it is provided A specific embodiment of these tracing systems whereby it is possible to do without a memory of excessive size, involves effecting in the known manner a projection of the different patterns to be reproduced, previously stored in an optical form, and combining said optical projection with the tracing system according to the invention, the latter being employed in this case to produce the interconnections or joints between the different patterns.

In certain cases, it is even possible to project incomplete patterns whose internal connections are effected by means of the tracing system by digital deflection, which permits the production, by means of a single in-complete pattern, of several different patterns in accordance with the instructions received by the digital deflector 8.

Figure 6:
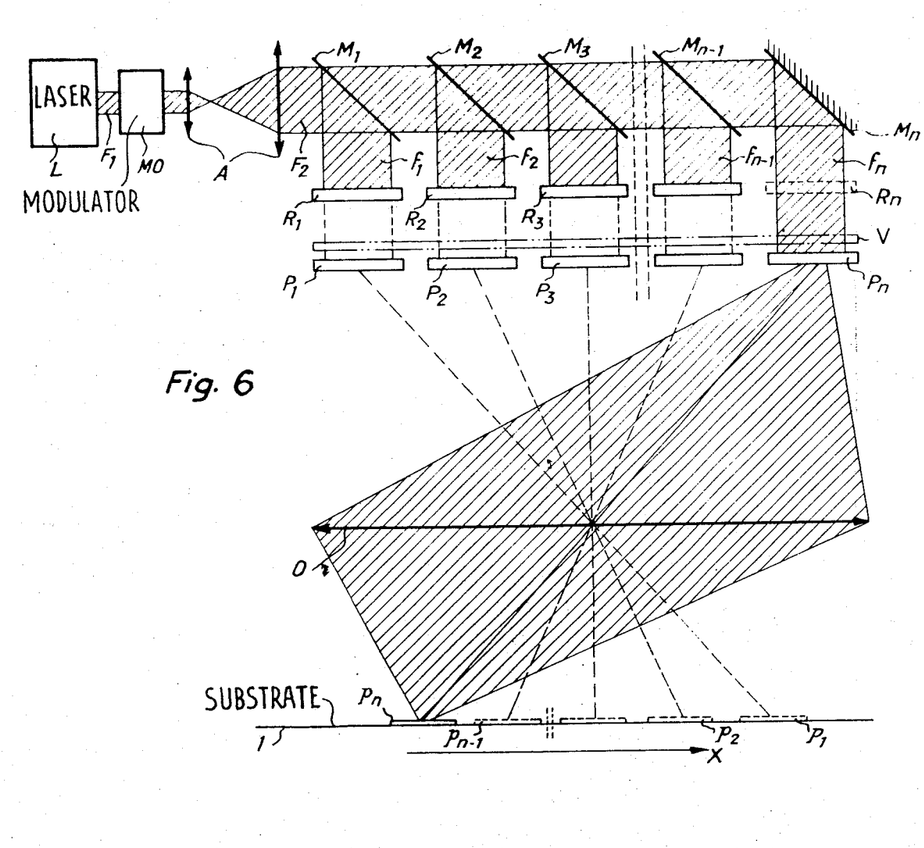
FIG. 6 is a front elevational view of the essential elements of a optical switching device.

FIG. 6 shown $n$ optical slides or diapositives $P_1$, $P_2$, $P_3$ ... $P_n$ representing base circuit patterns each of which must be capable of being projected in a predetermined zone of a surface 1 which is for example, the substrate 1 on which the mask must be drawn. To simplify the Figure, this substrate 1 is shown in direct view of the diapositives ; in fact, as indicated in FIG. 1, the images $p_1, p_2 \ldots p_n$ of the diapositives are projected onto the substrate 1 through the medium of a semireflecting mirror which reflects said images in the direction of the substrate while it transmits the laser beam issuing from the digital deviator of the inscribing system. As concerns the relative scale of the views $P_1$, $P_2$, $P_m$, themselves and of the images $p_1, p_2, \ldots p_n$, it has not been respected here. The projecting system in fact practically always reduces the slide to one-tenth for example.

The projecting system and its device for switching the slides according to the invention comprise essentially the following elements.

A light source L ; preferably of the laser type, delivers a fine beam $F_1$ of parallel rays. An optical system transforms it into a parallel beam of appropriate diameter which depends on the area of the slides to be projected.

Partly-reflecting mirrors $M_1, M_2 \ldots M_{m-1}$ and a mirror M divide the beam $F_2$ into $n$ beams $f_1, f_2 \ldots f_n$ which are parallel and of equal intensity. Mechanically-controlled shutters diagrammatically shown at $R_1, R_2$ ... $R_n$ normally mask these beams. The opening of the shutters upon reception of instructions from the computer associated with the tracing system, permits the illumination of the corresponding slide which is thus projected by the lens 0 onto the substrate 1. In FIG. 6, the shutter $R_n$ is shown open ; it is the slide $P_n$ which is projected onto the plate at $p_n$.

The substrate 1, which is part of the tracing system according to the invention, moves in the course of the inscriptions in the two orthogonal X and Y directions ; the X direction is, for example, that indicated in FIG. 5 and the direction Y is perpendicular to the plane of FIG. 5.

In order to obtain a precise projected image $p_n$ and in particular without excessive streaking notwithstanding these displacements, an intensity modulator MO operating on the all or nothing principle controls according to instructions from the computer, the delivery or extinction of the beam $F_1$ and the exposure time of the slide selected and projected onto the substrate. The presence of this modulator has for result, among other things to facilitate the construction and control of mechanical shutters $R_1 \ldots R_n$ whose opening time can thus be longer than the exposure time.

A frosted glass V is placed in the path of the light beams $f_1 \ldots f_n$ so as to partly diffuse the incident light furnished by the laser source L and permit illuminating a maximum area of the lens 0 which improves the resolution of the projected images $p_1 \ldots p_n$. In order to preclude possible defects which the grain of the frosted glass might produce on these images, the frosted glass may be a rotating glass or may be constituted by two crossed frosted glasses rotating in opposite directions.

In order to improve the quality of the definition and the uniformity of illumination of the projected images $p_1 \ldots p_n$ only the mirror ($M_3$ in FIG. 6) on the optical axis of the lens 0 is strictly inclined at 45° to the axis of the beam $F_2$, the others inclined at a suitable angle slightly different from 45°.

It is of course understood that in such a projecting system the projected images $p_1 \ldots p_n$, of the elementary patterns representing base circuits are all projected in different zones of the substrate 1. The combination of these different projection zones and the displacement in the X direction of the substrate 1 due to the action of the carriages of the tracing system controlled by the computer permits the inscription of these patterns in the required regions. These inscriptions are effected by means of conventional programming methods unnecessary to describe here.

An important advantage of the slide switching device according to the invention, apart from its rapid operation, is that as the slides are completely fixed in the course of the selecting operation, the inevitable mechanical defects of the switching device do not modify the positioning of the patterns which is defined by a preliminary adjustment carried out at the start of the operations.

A modification of the device which has just been described enables a slight drawback to be avoided. Indeed, in this device, the beam $F_2$ delivered by the source L is constantly divided into $n$ beams of each of which has a power reduced in the ratio of $n$ with respect to the beam $F_2$. This may require, when $n$, is large, a laser source of high power.

In order to avoid this, the aforementioned modification consist in combining the function of the mechanical shutters and partly reflecting mirrors.

In this case, the shutters, $R_1 \ldots R_n$ take the place of the mirrors $M_1 \ldots M_n$ shown in FIG. 6 and each of the shutters has a reflecting mirror $M_1 \ldots M_{n-1}$. The last path $R_n$ has solely a reflecting mirror $M_n$. These shutters are normally outside the beam $F_2$ and only the shutter $R_1$ which intersects this beam illuminates the corresponding slide $P_1$ with the whole of the power of the laser source L when the beam $F_2$ is transmitted by the modulator MO.

Figure 7:
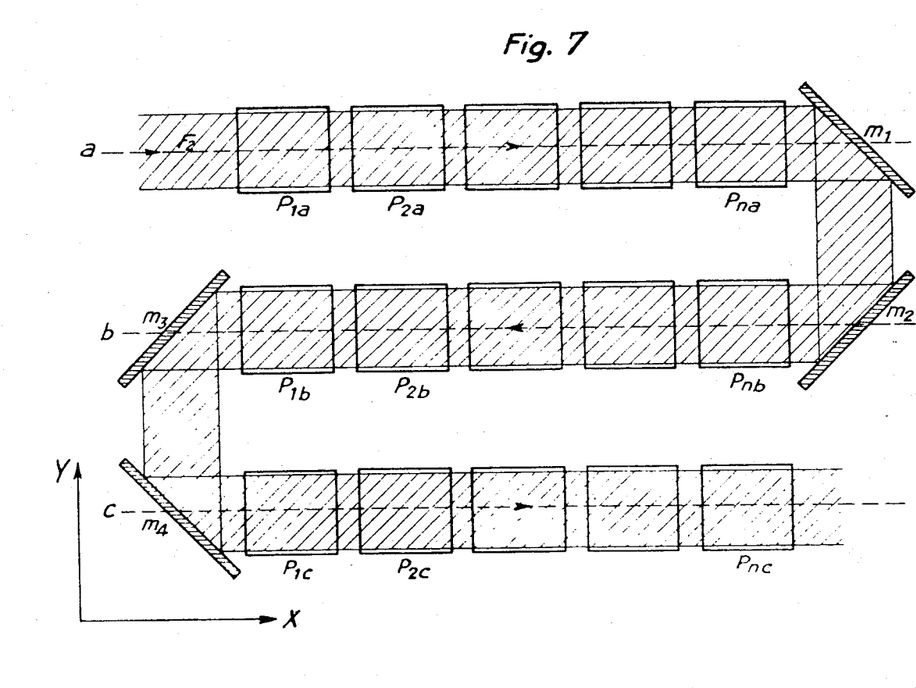
FIG. 7 is a top view of a modification of the device shown in FIG. 6 for projection of optical data in a tracing system according to the invention.

FIG. 7 shows diagrammatically from above the arrangement of three rows $a$, $b$, $c$ of slides $P_1$ to $P_n$ such as the row shown in FIG. 1. Only the main light beam $F_2$ is visible here, which illuminates the three rows through the medium of four mirrors $m_1$, $m_2$, $m_3$, $m_4$. The divided shutters, mirrors and beams of each row have not been shown here. They are identical to those shown in FIG. 6.

It must be understood that this arrangement is only an example and that the number of rows arranged in this way can be different from 3. This number depends on the numerical data of the tracing system employed. It depends essentially, on one hand, on the dimension in the Y direction of a band B that is the maximum deviation obtained by the digital deviator, and, on the other hand, on the dimensions of the projected images of the elementary patterns.

What I claim is:

1. Line tracing system using a beam of laser energy for exposing a photo-sensitive substrate comprising : a source of coherent radiant energy emitting said beam, supporting means for allowing displacements of said substrate in two mutually perpendicular directions, deflection control means having at least two control inputs, first and second motor means for respectively positioning said substrate along said directions, first and second monitoring means respectively evaluating the displacements of said substrate along said directions, and a digital optical positioned on the path of said beam between said source and said substrate ; said motor means being connected to and controlled by data derived from said deflection control means ; said digital optical deflector being connected to and controlled by data from said deflection control means ; said two control inputs being respectively controlled by data supplied from said first and second monitoring means ; said deflection control means including a computer comprising a binary counter having N outputs and a pulse counting input ; said digital optical deflector having N successive cells respectively controlled by said N outputs to provide $2^N$ directions of deviation of said beam ; said directions of deviation lying within a plane intersecting the upper face of said substrate along a straight line of scan ; said pulse counting input being controlled by data supplied from said first monitoring means ; the displacement of said substrate along one of said directions of displacement being evaluated by said first monitoring means.

2. Line tracing system as claimed in claim 1, wherein said line of scan is at an angle with said other direction of displacement of said substrate.

3. Line tracing system as claimed in claim 2, wherein said beam exposes a substantially square area of said upper face, the width of said area being substantially $2^N$ times smaller than the length of said line of scan ; the tangent of aid angle being substantially equal to $2^{-N}$.

4. Line tracing system as claimed in claim 3, wherein said first monitoring means comprise interferometric measuring means for supplying a pulse to the input of said binary counter each time said substrate undergoes a displacement quantum $2^N$ times smaller than the width of said area.

5. Line tracing system as claimed in claim 1, further comprising an optical projection device for projecting patterns ; said patterns being optically stored within said optical projection device.

6. Line tracing system as claimed in claim 5, wherein said optical projection device comprises : a flashlamp, a semireflective mirror positioned above said substrate, and projector means positioned for receiving the luminous energy supplied from said flash lamp, and projecting upon the upper face of said substrate images of said patterns.

7. Line tracing system as claimed in claim 6, wherein said projector means comprise beam splitting means, a plurality of optical storage elements carrying said patterns and positioned for receiving luminous energy from said beam splitting means, and lens means for forming onto said upper face an image of said patterns.

8. Line tracing system as claimed in claim 7, wherein said beam splitting means comprise a plurality of fixed semireflective mirrors ; said projection means further comprising shutter means positioned between said mirrors and said optical storage elements.

9. Line tracing system as claimed in claim 7, wherein said beam splitting means comprise a plurality of moving mirrors ; said projection means further comprising means for selectively positioning said moving mirrors on the path of the luminous beam emerging from said flashlamp.

* * * * *